United States Patent
Chee et al.

(10) Patent No.: US 6,262,753 B1
(45) Date of Patent: Jul. 17, 2001

(54) ELECTROPHOTOGRAPHIC IMAGING APPARATUS WITH REDUCED PACKAGING SIZE

(75) Inventors: Christopher Gregory Chee; Paul Douglas Horrall; Gregory Lawrence Ream, all of Lexington; Earl Dawson Ward, II, Richmond, all of KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 09/639,693

(22) Filed: Aug. 16, 2000

(51) Int. Cl.$^7$ ..................................................... G03G 15/01
(52) U.S. Cl. ........................... 347/115; 347/152; 347/232
(58) Field of Search ..................................... 347/115, 116, 347/138, 152, 232, 245, 263; 399/107, 299

(56) References Cited

U.S. PATENT DOCUMENTS

| 4,494,103 | 1/1985 | Jarosz et al. . |
|---|---|---|
| 4,761,046 | 8/1988 | Funato . |
| 4,916,547 | 4/1990 | Katsumata et al. . |
| 5,278,589 | 1/1994 | Wong . |

FOREIGN PATENT DOCUMENTS

| 9-269683 | * 10/1997 | (JP) . |
|---|---|---|
| 11-95520 | * 4/1999 | (JP) . |

* cited by examiner

*Primary Examiner*—Joan Pendegrass
(74) *Attorney, Agent, or Firm*—Taylor & Aust, P.C.

(57) ABSTRACT

An electrophotographic imaging apparatus includes a plurality of photoconductive drums and a plurality of printhead assemblies. Each drum has an axis of rotation and a photoconductive peripheral surface. A plurality of the axes of rotation of the drums lie in a generally common plane. The peripheral surface of each drum rotates in a common direction defining an advance direction of the print medium. Adjacent drums are disposed at a first distance away from each other between the axes of rotation. Each printhead assembly is associated with a respective drum and is configured for generating a laser beam which impinges upon the respective drum along a line of incidence. The printhead assemblies are disposed at a second distance from one to another which is greater than the first distance.

22 Claims, 5 Drawing Sheets

ELECTROPHOTOGRAPHIC IMAGING APPARATUS WITH REDUCED PACKAGING SIZE

BACKGROUND OF THE INVENTION

1. Field of the Invention

The present invention relates to an electrophotographic imaging apparatus such as a laser printer, and, more particularly, to such an imaging apparatus including multiple printhead assemblies and photoconductive drums.

2. Description of the Related Art

An electrophotographic imaging apparatus, such as a laser printer, may be configured as a multi-color imaging apparatus for producing color images on a print medium. In a tri-color imaging apparatus, it is known to provide four separate toner reservoirs which contain different color toners. For example, a first toner reservoir may contain yellow toner; a second toner reservoir may contain magenta toner; a third toner reservoir may contain cyan toner; and a fourth toner reservoir may contain black toner. Each toner reservoir is positioned in association with a photoconductive (PC) drum on which a latent image is formed using a laser beam which is projected from a printhead assembly. The laser beam projects against the peripheral surface of the PC drum at an angle of incidence relative to a line extending through an axis of rotation of the PC drum and the point of incidence of the laser beam. The laser beam is scanned across the peripheral surface of the PC drum along a line extending parallel to the axis of rotation of the drum. In an image forming apparatus as described above, the printhead assemblies may be configured substantially identical to each other. Moreover, the printhead assemblies are configured to project the scanned laser beam at identical angles to the PC drum along lines of incidence which are positioned at the same relative position from one drum to another. Although such a configuration provides high quality printing, geometric constraints associated with such an arrangement tend to increase the packaging size of the imaging apparatus.

What is needed in the art is an EP imaging apparatus which provides high quality printing with a reduced overall packaging size.

SUMMARY OF THE INVENTION

The present invention provides an electrophotographic imaging apparatus, such as a laser printer, with a reduced packaging size by increasing the distance between adjacent printhead assemblies and decreasing the distance between adjacent PC drums.

The invention comprises, in one form thereof, an electrophotographic imaging apparatus for printing on a print medium, including a plurality of photoconductive drums and a plurality of printhead assemblies. Each drum has an axis of rotation and a photoconductive peripheral surface. A plurality of the axes of rotation of the drums lie in a generally common plane. Each peripheral surface rotates in a common direction defining an advance direction of the print medium. Each printhead assembly is associated with a respective drum and is configured for generating a laser beam which impinges upon the respective drum along a line of incidence. The laser beam is disposed at an angle of incidence relative to a perpendicular extending through the line of incidence and the axis of rotation. The angle of incidence sequentially increases from one printhead assembly to another along the advance direction.

The invention comprises, in another form thereof, an electrophotographic imaging apparatus including a plurality of photoconductive drums and a plurality of printhead assemblies. Each drum has an axis of rotation and a photoconductive peripheral surface. A plurality of the axes of rotation of the drums lie in a generally common plane. The peripheral surface of each drum rotates in a common direction defining an advance direction of the print medium. Adjacent drums are disposed at a first distance away from each other between the axes of rotation. Each printhead assembly is associated with a respective drum and is configured for generating a laser beam which impinges upon the respective drum along a line of incidence. The printhead assemblies are disposed at a second distance from one to another which is greater than the first distance.

An advantage of the present invention is that the packaging size of the electrophotographic imaging apparatus is reduced.

Another advantage is that the distance between adjacent printhead assemblies may be increased by either sequentially increasing the angle of incidence or sequentially moving the line of incidence from one photoconductive drum to another along an advance direction.

Yet another advantage is that the printhead assemblies may be precisely and easily located relative to one another in the image forming apparatus using precisely located support channels attached to a frame.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
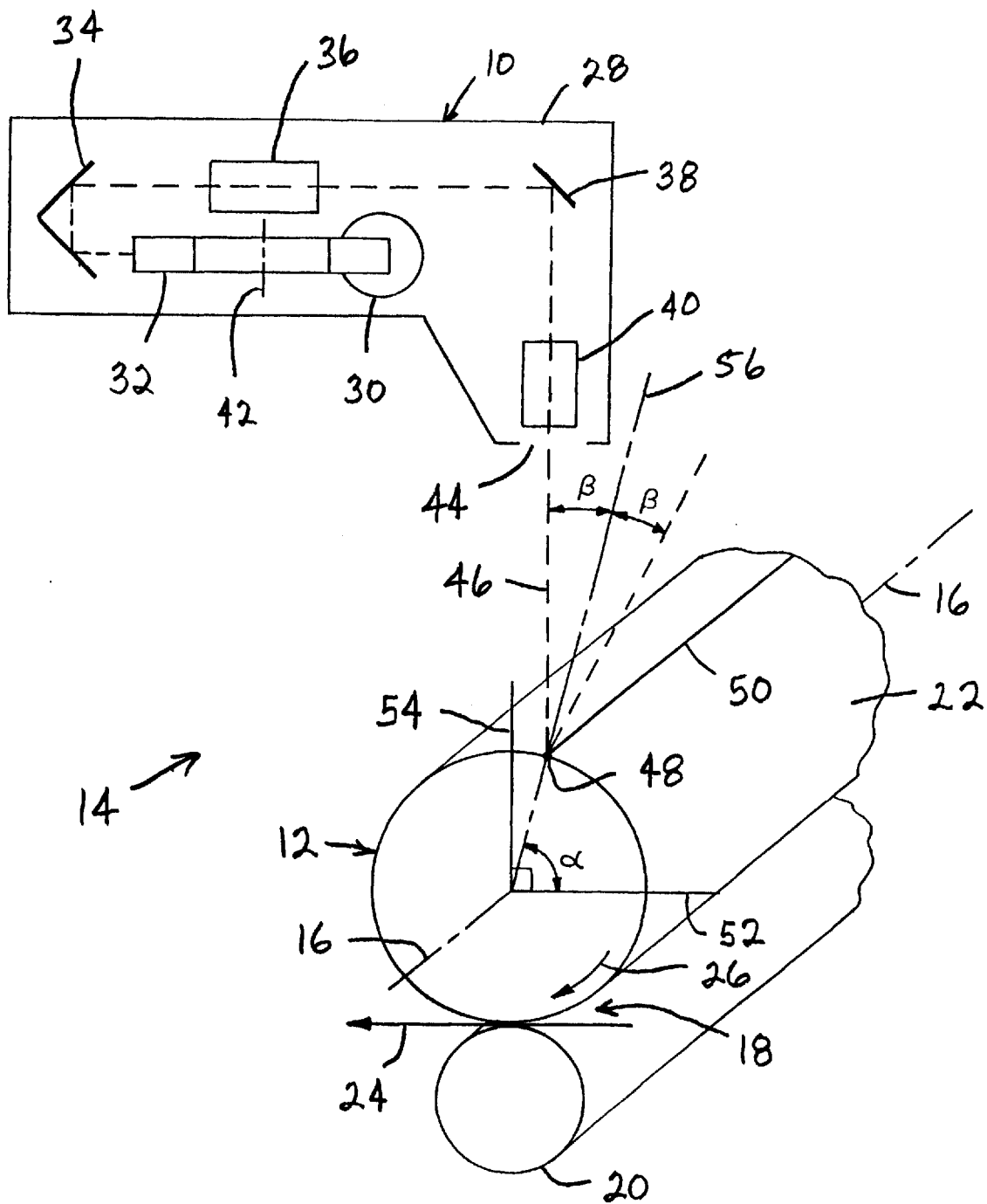
FIG. 1 is a simplified, schematic illustration of an embodiment of a printhead assembly and photoconductive drum which may be utilized with an electrophotographic imaging apparatus of the present invention.

Referring now to the drawings, and more particularly to FIG. 1, there is shown a simplified schematic illustration of a printhead assembly 10 and photoconductive drum 12 which are incorporated into one embodiment of an electrophotographic (EP) imaging apparatus 14 of the present invention. In the embodiment shown, EP imaging apparatus 14 is in the form of a laser printer, but may be configured as a different imaging apparatus such as an EP photocopier, etc.

PC drum 12 rotates about an axis of rotation 16, and defines a nip 18 with a back-up roller 20. Drum 12 includes a photoconductive peripheral surface 22 on which a latent image is formed, in known manner. The latent image is transferred to either an intermediate transfer member such as a photoconductive belt (not shown), or directly to a print medium such as paper (not shown) which travels through nip 18 in advance direction 24. Advance direction 24 is generally tangent to direction of rotation 26 of drum 12 at nip 18, and thus is generally defined by direction of rotation 26.

Printhead assembly 10 includes a housing 28 carrying a laser source 30, polygon mirror 32, turn-around mirror 34, first lens 36, fold-down mirror 38 and second lens 40. Laser source 30 generates a laser beam in a known manner which impinges upon polygon mirror 32. Polygon mirror 32 rotates about an axis of rotation 42 at a predetermined rotational speed. As polygon mirror 32 rotates, the laser beam generated by laser source 30 scans across turn-around mirror 34 (i.e., in a direction perpendicular to the drawing of FIG. 1), thereby ultimately causing the laser beam to scan across peripheral surface 22 of drum 12, as will be described hereinafter. The laser beam then passes through first lens 36 and is reflected at a generally right angle using fold-down mirror 38. The laser beam then passes through second lens 40 and exits through aperture 44. The travel path of the laser beam is thus represented by dashed line 46.

Laser beam 46 is projected against peripheral surface 22 of PC drum 12 at a point of incidence 48, and is scanned across peripheral surface 22 along a line of incidence 50 as polygon mirror 32 rotates. A parallel 52 is disposed generally parallel to advance direction 24; and a normal 54 extends generally perpendicular to advance direction 24. Point of incidence 48 and line of incidence 50 are each disposed at an angle $\alpha$ relative to parallel 52 and advance direction 24. Angle $\alpha$ defines a perpendicular 56 which extends generally perpendicular to line of incidence 50 (i.e., extending through line of incidence 50 and axis of rotation 16 and thus perpendicular to peripheral surface 22). Laser beam 46 is disposed at an angle of incidence $\beta$ relative to perpendicular 56 as laser beam 46 is scanned across line of incidence 50. The specular component of light reflected from peripheral surface 22 of drum 12 is disposed at a complementary angle $\beta$ relative to perpendicular 56.

Figure 2:
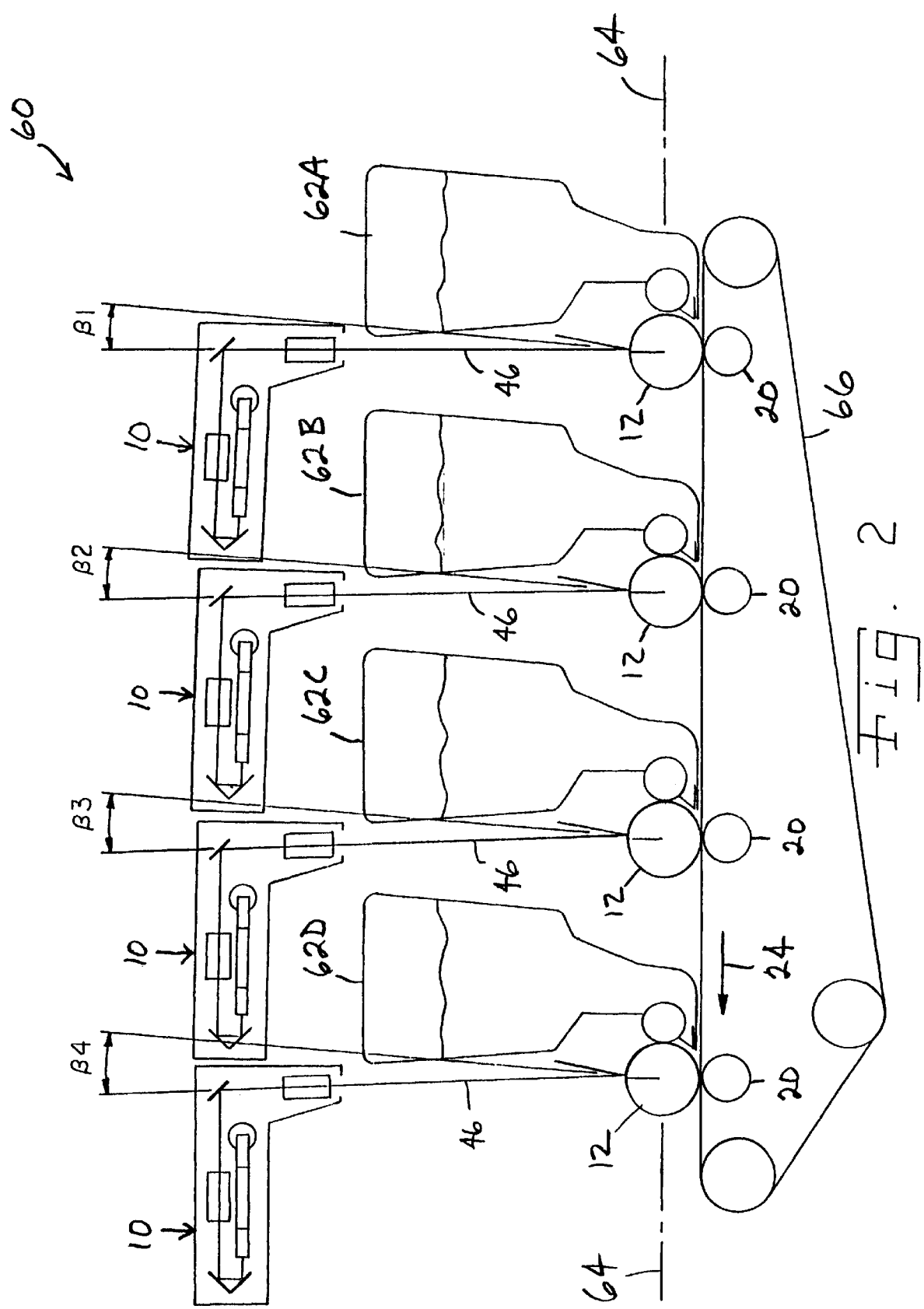
FIG. 2 is a schematic view of an electrophotographic imaging apparatus of the present invention including multiple printhead assemblies and photoconductive drums as shown in FIG. 1.

Referring now to FIG. 2, there is shown another embodiment of an EP imaging apparatus 60 of the present invention. EP imaging apparatus 60 corresponds to a tricolor printer with four separate toner reservoirs 62A, 62B, 62C and 62D which respectively contain different color toners. In the embodiment shown, toner reservoir 62A contains yellow toner; toner reservoir 62B contains magenta toner; toner reservoir 62C contains cyan toner; and toner reservoir 62D contains black toner. Each toner reservoir 62A–62D is associated with a respective PC drum 12 which is configured the same as PC drum 12 shown in FIG. 1. Each drum 12 includes an axis of rotation 16 which lies in a common plane 64. Drums 12 thus define a substantially linear advance direction 24 of ITM 66 in the form of a belt. Each PC drum 12 is respectively associated with a printhead assembly 10, which are substantially identically configured relative to each other in terms of structural components.

According to an aspect of the present invention, printhead assemblies 10 and PC drums 12 are arranged relative to each other to reduce the packaging size of each EP imaging apparatus 60. More particularly, each printhead assembly 10 is configured to project a laser beam against a corresponding drum 12 at a different angle of incidence $\beta 1$, $\beta 2$, $\beta 3$ or $\beta 4$. Angles of incidence $\beta 1-\beta 4$ sequentially increase from one printhead assembly 10 to another along advance direction 24 of EP imaging apparatus 60. That is, from an upstream end of ITM 66 associated with toner reservoir 62A to a downstream end of ITM 66 associated with toner reservoir 62D, the angle of incidence $\beta 1-\beta 4$ sequentially increases from one printhead assembly 10 to another along advance direction 24.

It has been found that the angle of incidence $\beta$ may maximally vary between approximately 2 and 10° relative to perpendicular 56 and still provide high quality printing. In the embodiment shown in FIG. 2, the angle of incidence $\beta$ generally varies between 5 and 8°, and increases by a value of 0.75° from one printhead assembly 10 to another in advance direction 24. In particular, $\beta 1$ equals approximately 5°; $\beta 2$ equals approximately 5.75°; $\beta 3$ equals approximately 6.5°; and $\beta 4$ equals approximately 7.25°. By increasing the angle between adjacent printhead assemblies 10, the distance between adjacent printhead assemblies (using any arbitrary reference location) is increased from one printhead assembly 10 to another in advance direction 24. This in turn allows PC drums 12 to be placed closer together relative to each other (using, e.g., a center to center distance from one axis of rotation to another). The overall packaging size of EP imaging apparatus 60 is thus reduced since the distance between PC drums 12 is reduced.

Figure 3:
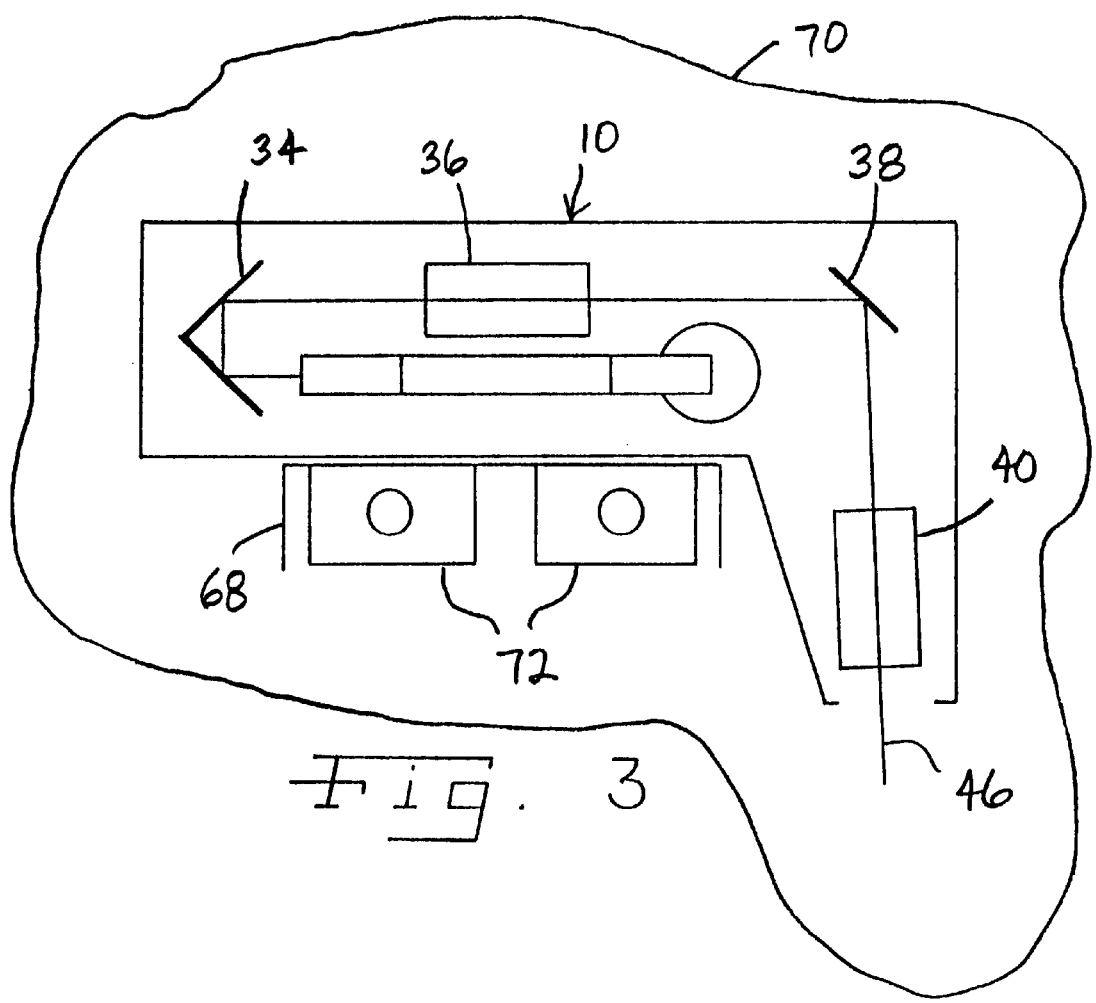
FIG. 3 illustrates a support channel coupled with an associated printhead assembly.

In the embodiment of FIG. 2, each printhead assembly 10 has a second lens 40 which is placed at a distance of approximately 120 mm from peripheral surface 22 of a corresponding PC drum 12. Laser beam 46 projects against each PC drum 12 at an angle $\alpha$ of approximately 85°. Since the angle $\alpha$ remains constant, while the angle $\beta$ changes from one printhead assembly 10 to another, it is apparent that the relative mounting location of each printhead assembly 10, as well as the angular orientation of each printhead assembly 10, varies a corresponding amount within EP imaging apparatus 60. To precisely locate each printhead assembly 10, EP imaging apparatus 60 includes a plurality of support channels 68 (FIG. 3) which are precisely located on and attached to frame 70 of EP imaging apparatus 60. Each support channel 68 extends generally perpendicular from frame 70, and includes one or more mounting flanges 72 which extend parallel to and are disposed against frame 70. Each mounting flange 72 is suitably attached with frame 70, such as by a toxing process, riveting, welding, or the like. Each support channel 68 is suitably configured, such as with precisely located attachment holes, keying, etc. (not shown) to precisely locate and orient a corresponding printhead assembly 10.

In the embodiment shown in FIG. 2, each support channel 68 is mounted at a distance of approximately 147 mm from peripheral surface 22 of the corresponding PC drum 12. The 0.75 increase in the angle of incidence between each adjacent printhead assembly 10 along advance direction 24 provides an additional 1.9 mm spacing between adjacent printhead assemblies 10. More particularly, in the embodiment shown in FIG. 2, the spacing between axis of rotation 16 of adjacent PC drums 12 is 101 mm and the spacing between adjacent printhead assemblies 10 is 102.9 mm.

Figure 4:
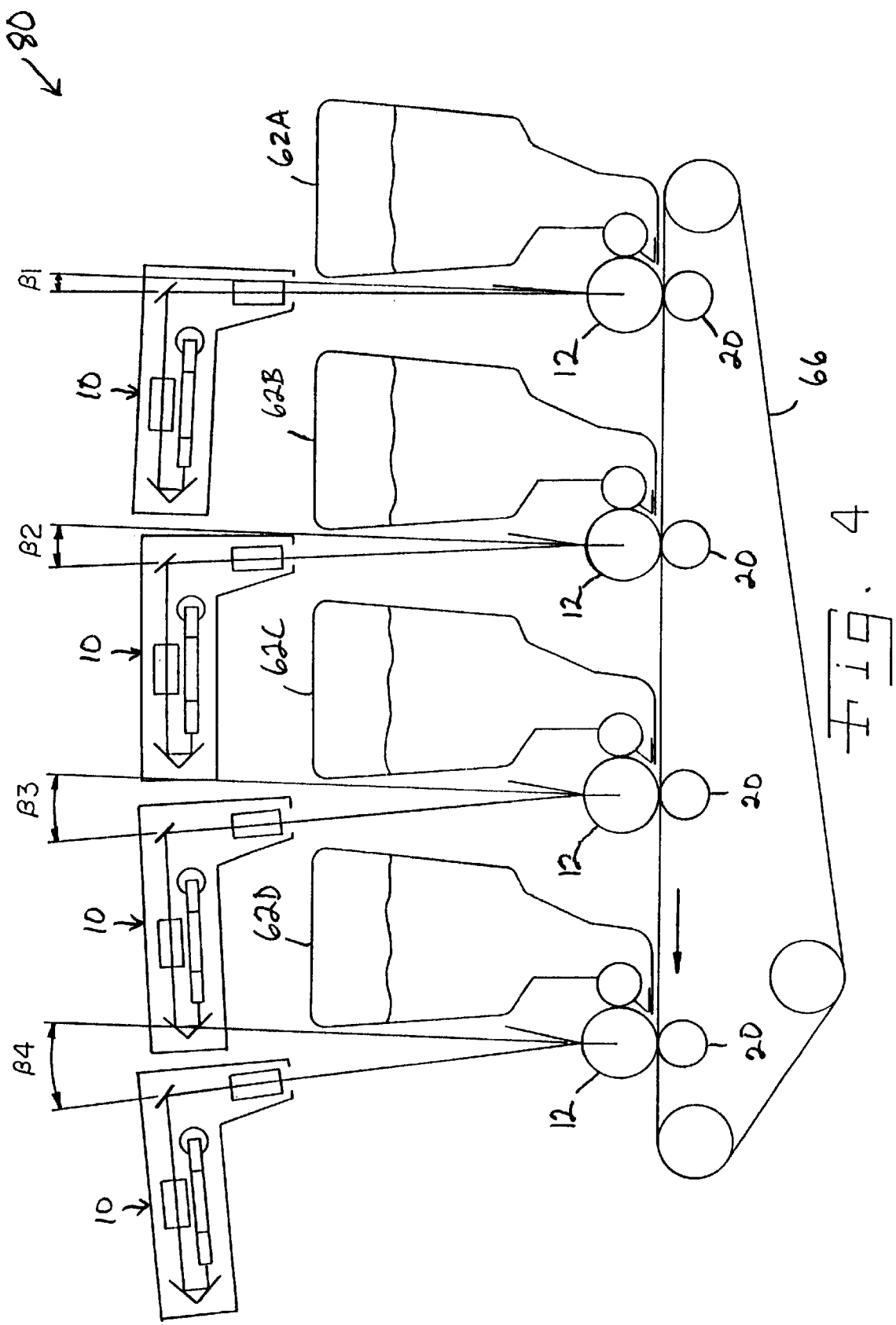
FIG. 4 illustrates another embodiment of an electrophotographic imaging apparatus of the present invention.

FIG. 4 illustrates another embodiment of an EP imaging apparatus 80 of the present invention. As indicated above, it has been found that an angle of incidence between 2 and 10° provides high quality printing. EP imaging apparatus 80 is configured as a tri-color laser printer with four printhead assemblies 10 as shown. Printhead assemblies 10 are arranged to maximize the distance between adjacent printhead assemblies 10 while still staying within the 2 to 10° angle of incidence limit providing good performance. By maximizing the distance between adjacent printhead assemblies 10, the corresponding distance between adjacent PC drums 12 is also fully minimized. The angle of incidence β from one printhead assembly 10 to another in advance direction 24 increases by a value of 2.66° from one printhead assembly 10 to another in advance direction 24. Utilizing a spacing of about 147 mm from each support channel 68 to an associated PC drum 12, this results in an additional 6.8 mm between adjacent printhead assemblies 10 as compared with a conventional arrangement wherein laser beams 46 are arranged parallel to each other within EP imaging apparatus 80.

Figure 5:
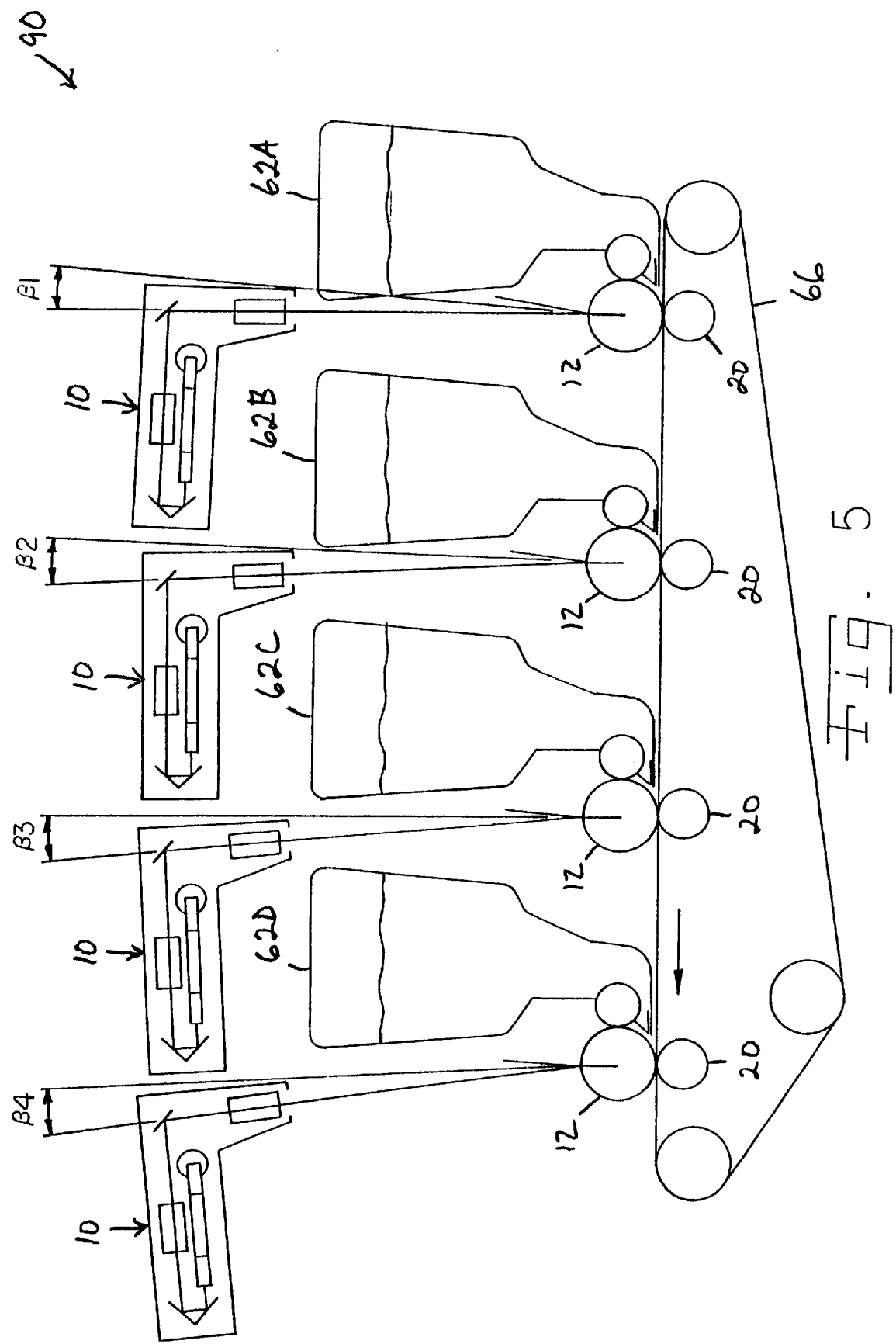
FIG. 5 illustrates yet another embodiment of an electrophotographic imaging apparatus of the present invention.

FIG. 5 illustrates yet another embodiment of an EP imaging apparatus 90 of the present invention which provides a reduced package size. In the embodiment shown in FIG. 5, the angle of incidence β1–β4 respectively associated with PC drums 12 remains constant. Nonetheless, printhead assemblies 10 are arranged to provide a greater distance therebetween, thus reducing the overall packaging size of EP imaging apparatus 90. This is accomplished by increasing the angle α of each perpendicular 56A, 56B, 56C and 56D from one PC drum 12 to another in advance direction 24. As the angle α increases from one printhead assembly 10 to another in advance direction 24, the associated printhead assembly 10 must of course be repositioned within EP imaging apparatus 90 to maintain a constant distance relative to PC drum 12 as well as a constant angle of incidence β1–β4. In the embodiment shown, each PC drum 12 has a diameter of approximately 30 mm, and the angular change of each laser beam 46 results in the line of incidence 50 of each PC drum 12 being sequentially offset from one drum 12 to another along advance direction 24 between 0.100 and 0.800 mm, preferably between 0.150 and 0.300 mm, and more preferably about 0.262 mm. That is, the point of incidence 48 and line of incidence 50 shifts in a counter-clockwise direction about 0.262 mm along peripheral surface 22 from one drum 12 to another in advance direction 24. This corresponds to a 1° change in angle on a 30 mm diameter PC drum. This results in the spacing between adjacent printhead assemblies 10 being increased compared to the spacing between adjacent PC drums 12 with an overall reduced packaging size.

EP imaging apparatus 14, 60, 80 and 90 have been detailed for the case in which the axes of rotation of the drums lie in a common plane. However, the present invention is equally applicable to the case in which the drums are located in a shallow, convex arc; or to the case in which a single drum (black, for example) is moved out of the plane of the remaining drums, such as may be done when printing in a black only mode. For example, in another embodiment (not shown because of minuscule tolerance differences between previous figures), the black PC drum associated with developer 62D in FIG. 1 is dropped by 1 mm with respect to the plane of the axes of the remaining color PC drums. This results in a 1 mm translation of the entire black station in a direction downward and perpendicular to the plane 64 (FIG. 2) established by the remaining PC drums. Here the black station consists of print head 10, PC drum 12, developer 62D, and transfer roll 20. The angle of incidence of the laser beam on the black drum is no different than in the case where all drums are located in a common plane.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An electrophotographic imaging apparatus for printing on a print medium, comprising:

a plurality of photoconductive drums, each said drum having an axis of rotation and a photoconductive peripheral surface, a plurality of said axes of rotation lying in a generally common plane, each said peripheral surface rotating in a common direction defining an advance direction of the print medium; and a plurality of printhead assemblies, each said printhead assembly being associated with a respective said drum and being configured for generating a laser beam which impinges upon said respective drum along a line of incidence, said laser beam disposed at an angle of incidence relative to a perpendicular extending through said line of incidence and said axis of rotation, said angle of incidence sequentially increasing from one printhead assembly to another along said advance direction.

2. The electrophotographic imaging apparatus of claim 1, wherein said angle of incidence for each said printhead assembly is between 2 and 10°.

3. The electrophotographic imaging apparatus of claim 2, wherein said angle of incidence for each said printhead assembly is between 5 and 8°.

4. The electrophotographic imaging apparatus of claim 1, wherein said angle of incidence for each said printhead assembly sequentially increases between 0.5 and 3° from one printhead assembly to another along said advance direction.

5. The electrophotographic imaging apparatus of claim 3, wherein said angle of incidence for each said printhead assembly sequentially increases about 0.75° from one printhead assembly to another along said advance direction.

6. The electrophotographic imaging apparatus of claim 4, wherein said angle of incidence for each said printhead assembly sequentially increases about 2.7° from one printhead assembly to another along said advance direction.

7. The electrophotographic imaging apparatus of claim 1, wherein each said printhead assembly is spaced at a distance of about 120 millimeters from said respective drum.

8. The electrophotographic imaging apparatus of claim 1, wherein said perpendicular is disposed at an angle (α) relative to said advance direction which is the same from one printhead assembly to another.

9. The electrophotographic imaging apparatus of claim 8, wherein said perpendicular is disposed at an angle (α) of about 85° relative to said advance direction.

10. The electrophotographic imaging apparatus of claim 1, wherein said plurality of printhead assemblies comprises four printhead assemblies.

11. An electrophotographic imaging apparatus, comprising:

a plurality of photoconductive drums, each said drum having an axis of rotation and a photoconductive peripheral surface, a plurality of said axes of rotation lying in a generally common plane, each said peripheral surface rotating in a common direction defining an advance direction of the print medium, adjacent said drums being disposed at a first distance away from each other between said axes of rotation; and a plurality of printhead assemblies, each said printhead assembly being associated with a respective said drum and being configured for generating a laser beam which impinges upon said respective drum along a line of incidence, said printhead assemblies being disposed at a second distance from one to another which is greater than said first distance.

12. The electrophotographic imaging apparatus of claim 11, wherein said second distance is between 0.5 and 8 millimeters greater than said first distance.

13. The electrophotographic imaging apparatus of claim 12, wherein said second distance is about 1.9 millimeters greater than said first distance.

14. The electrophotographic imaging apparatus of claim 13, wherein said first distance is about 101 millimeters and said second distance is about 102.9 millimeters.

15. The electrophotographic imaging apparatus of claim 12, wherein said second distance is about 6.8 millimeters greater than said first distance.

16. An electrophotographic imaging apparatus for printing on a print medium, comprising:

a plurality of photoconductive drums, each said drum having an axis of rotation and a photoconductive peripheral surface, each said axis of rotation lying in a common plane, each said peripheral surface rotating in a common direction defining an advance direction of the print medium; and a plurality of printhead assemblies, each said printhead assembly being associated with a respective said drum and being configured for generating a laser beam which impinges upon said respective drum along a line of incidence, said line of incidence on each said drum being sequentially offset from one drum to another along said advance direction.

17. The electrophotographic imaging apparatus of claim 16, wherein said line of incidence on each said drum is sequentially offset a distance of between 0.100 and 0.800 millimeters.

18. The electrophotographic imaging apparatus of claim 17, wherein said line of incidence on each said drum is sequentially offset a distance of between 0.150 and 0.300 millimeters.

19. The electrophotographic imaging apparatus of claim 18, wherein said line of incidence on each said drum is sequentially offset a distance of about 0.262 millimeters.

20. The electrophotographic imaging apparatus of claim 16, wherein each said line of incidence is angularly offset from one drum to another opposite to said rotational direction.

21. The electrophotographic imaging apparatus of claim 20, wherein each said drum defines a normal extending through said axis of rotation and normal to said advance direction, and a perpendicular extending through said line of incidence and said axis of rotation, said perpendicular angularly varying relative to said normal from one drum to another.

22. The electrophotographic imaging apparatus of claim 16, wherein said laser beam is disposed at an angle of incidence relative to a perpendicular extending through said line of incidence and said axis of rotation, said angle of incidence being substantially the same from one printhead assembly to another.

* * * * *

UNITED STATES PATENT AND TRADEMARK OFFICE
CERTIFICATE OF CORRECTION

PATENT NO.     : 6,262,753 B1                                              Page 1 of 1
DATED          : July 17, 2001
INVENTOR(S)    : Umberto Pietrinferno It is certified that error appears in the above-identified patent and that said Letters Patent is hereby corrected as shown below:

Title page,
Items [12] and [75], "Pietriferno" should read as -- Pietrinferno --; and insert
-- [73] Assignee: Sherley Pietrinferno,
                  Ste-Ther Signed and Sealed this Second Day of September, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,262,753 B1　　　　　　　　　　　　　　　　　　　　　　　Page 1 of 1
DATED         : July 17, 2001
INVENTOR(S)   : Umberto Pietrinferno It is certified that error appears in the above-identified patent and that said Letters Patent is hereby corrected as shown below:

<u>Title page,</u>
Items [12] and [75], "Pietriferno" should read -- Pietrinferno --; and insert
-- [73]  Assignee:  Sherley Pietrinferno,
　　　　　　　　　　Ste-Therese-de-Blainville, QBC, (CA) --.

Signed and Sealed this

Thirtieth Day of September, 2003

JAMES E. ROGAN
*Director of the United States Patent and Trademark Office*